US010559133B2

(12) United States Patent
Knoppert et al.

(10) Patent No.: US 10,559,133 B2
(45) Date of Patent: Feb. 11, 2020

(54) VISUAL SPACE MANAGEMENT ACROSS INFORMATION HANDLING SYSTEM AND AUGMENTED REALITY

(71) Applicant: Dell Products L.P., Round Rock, TX (US)

(72) Inventors: Michiel Sebastiaan Emanuel Petrus Knoppert, Amsterdam (NL); Deeder M. Aurongzeb, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 67 days.

(21) Appl. No.: 15/890,800

(22) Filed: Feb. 7, 2018

(65) Prior Publication Data
US 2019/0244426 A1 Aug. 8, 2019

(51) Int. Cl.
*G06T 19/00* (2011.01)
*G06F 3/01* (2006.01)
*G02B 27/01* (2006.01)
*G06T 19/20* (2011.01)

(52) U.S. Cl.
CPC .......... *G06T 19/006* (2013.01); *G02B 27/017* (2013.01); *G06F 3/011* (2013.01); *G06T 19/20* (2013.01); *G06T 2219/028* (2013.01); *G06T 2219/2004* (2013.01)

(58) Field of Classification Search
None
See application file for complete search history.

(56) References Cited

U.S. PATENT DOCUMENTS

| 5,558,619 A * | 9/1996 | Kami ................. A61B 1/00006 600/106 |
| 9,952,656 B2 * | 4/2018 | Poulos ..................... G06F 3/00 |
| 2010/0208033 A1 * | 8/2010 | Edge ....................... G06F 3/012 348/46 |
| 2011/0187706 A1 * | 8/2011 | Vesely .................... G06T 15/00 345/419 |
| 2011/0205242 A1 * | 8/2011 | Friesen ................... G06F 3/011 345/633 |
| 2013/0222410 A1 * | 8/2013 | Kameyama .......... H04N 13/344 345/589 |
| 2013/0234934 A1 * | 9/2013 | Champion .............. G06F 3/012 345/156 |

(Continued)

OTHER PUBLICATIONS

Sidhant Gupta et al., Soundwave: Using the Doppler Effect to Sense Gestures, Proceedings of the SIGCHI Conference on Human Factors in Computing Systems, pp. 1911-1914, 2012, https://ubicomplab.cs.washington.edu/pdfs/soundwave.pdf.

*Primary Examiner* — David H Chu
(74) *Attorney, Agent, or Firm* — Zagorin Cave LLP; Robert W. Holland (57) ABSTRACT

An information handling system coordinates presentation of a visual item with a flat panel display and head mounted display using tokens detected by one or more sensors, such as a depth camera and ultrasonic sensor. Upon detection of a token by a sensor, gestures detected by at least one sensor manipulate a three dimensional image presented at a location by the head mounted display. A visible surface determination of the view area sorts upright extents of the items presented by the head mounted display and flat panel display so the united view of an end user is uncluttered with image overlap.

20 Claims, 6 Drawing Sheets

(56) References Cited

U.S. PATENT DOCUMENTS

| | | | | |
|---|---|---|---|---|
| 2014/0078176 | A1* | 3/2014 | Kim | G06F 3/017 345/633 |
| 2014/0223349 | A1* | 8/2014 | Shin | G06F 3/0484 715/771 |
| 2014/0232637 | A1* | 8/2014 | Park | G02B 27/017 345/156 |
| 2015/0117831 | A1* | 4/2015 | Hanai | H04N 5/76 386/224 |
| 2016/0027215 | A1* | 1/2016 | Burns | G02B 27/0172 345/419 |
| 2016/0109937 | A1* | 4/2016 | Kim | G06F 1/163 345/156 |
| 2017/0060514 | A1* | 3/2017 | Kaufthal | G06F 3/1423 |
| 2017/0061694 | A1* | 3/2017 | Giraldi | G06T 19/006 |
| 2018/0033211 | A1* | 2/2018 | Berman | G06T 19/20 |
| 2018/0074332 | A1* | 3/2018 | Li | G06F 1/163 |
| 2018/0095542 | A1* | 4/2018 | Mallinson | G06F 1/163 |
| 2018/0095616 | A1* | 4/2018 | Valdivia | H04L 51/16 |
| 2018/0225875 | A1* | 8/2018 | Yasrebi | B60R 11/04 |
| 2018/0322706 | A1* | 11/2018 | Drouin | G06T 19/006 |

\* cited by examiner

VISUAL SPACE MANAGEMENT ACROSS INFORMATION HANDLING SYSTEM AND AUGMENTED REALITY

BACKGROUND OF THE INVENTION

Field of the Invention

The present invention relates in general to the field of information handling system display management, and more particularly to visual space management across information handling system and augmented reality.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems typically present output to end users through displays driven by a graphical processor. For example, an application executing on a central processor unit (CPU) generates visual information as output and then forwards the visual information to a graphics processor unit (GPU) that processes the visual information into pixel values for presentation on a display. Displays present visual information by generating colors at pixels as defined by the pixel values. Typical displays include liquid crystal displays (LCDs) and organic light emitting diode (OLED) displays. Generally, conventional displays are built as flat panels that present two dimensional visual images, although OLED displays sometimes include a curved surface to help enhance visual image presentation. In some instances, flat panel displays include some capability to present three dimensional visual images. Often, information handling systems include multiple display support so that visual information of the information handling system is presented across multiple displays. One recent innovation is to dispose a display in a horizontal orientation under a display having a vertical orientation. The horizontal display includes a touchscreen so that an end user can interact with the display on the desktop, such as by drawing or writing on the display with a stylus or interacting with the display through a totem or other object. The horizontal touchscreen provides a convenient input interface for CAD or other design applications.

Recently, augmented reality head mounted displays have gained popularity as a way to present visual information for gaming applications. A typical augmented reality head mounted display projects visual images ahead of the eyes of an end user so that the visual images appear as three dimensional objects to the end user. Augmented reality also passes visible light to the end user so that the end user sees the augmented reality visual objects against a "real" background of objects beyond the head mounted display. Gaming applications track an end users movements relative to the augment visual image so that an end user can interact with the augmented visual image, such as by reaching out with a hand to a location in space that matches the location in space of the augmented visual image. Although augmented reality finds popularity in gaming applications, commercial applications have also adapted augmented reality displays for commercial purposes, such as presenting three dimensional visual images of CAD designs.

One difficulty with using augmented reality in a commercial application is that end users often want to use the head mounted display while also working with a flat panel display that presents a conventional two dimensional visual image. If an end user views the augmented reality three dimensional image while also viewing a flat panel display, the visual images can overlap as the end user interacts with augmented reality view, leading to confusion by the end user regarding the viewed objects. An information handling system that interacts with both a flat panel display and a head mounted display has difficulty managing which visual image an end user is attempting to interact with, especially where the information handling system lacks feedback regarding the merging of end user physical interactions with three dimensional projected augmented reality items. Further, as the end user interacts with an augmented reality item to shift the item's position and orientation, the relationship of the augmented reality item visible portions is difficult to track. For example, the information handling system has to do a visible surface determination of the parts of the augmented reality that are actually visible relative to the end user's position. For instance, an end user attempting to manipulate an augmented reality visual image to change its orientation, and then to alter the appearance of the augmented reality visual image has to communicate to the information handling system how the augmented reality item is manipulated. As virtual items shift in appearance, visual surfaces of the virtual items have to allocate within a projected visual image changes to a desired subset of the image as defined at the information handling system design application. Managing sets of objects and gestures related to the objects becomes complex as an end user interacts simultaneously with the objects in flat panel visual images and head mounted visual images.

SUMMARY OF THE INVENTION

Therefore, a need has arisen for a system and method which provides visual space management across information handling system and augmented reality visual images.

In accordance with the present invention, a system and method are provided which substantially reduce the disadvantages and problems associated with previous methods and systems for coordinating between flat panel and augmented reality displayed visual images. An information handling system coordinates presentation of a visual image at a flat panel display and head mounted display based upon detection of a token that defines gesture inputs at the visual images. Upon association of gestures with a display, visual images of the displays are presented to support gesture manipulation without clutter and overlap.

More specifically, an information handling system processes information by executing instructions stored in memory, such as a design application running over an operating system that generates visual information that defines an item. The visual information is processed by one or more graphics processors to present as a visual image of the item at a flat panel display and as a three dimensional visual image of the item at a head mounted display. Plural sensors, such as a depth camera and an ultrasonic sensor, sense physical items disposed proximate the flat panel display and apply the sensed physical items to manage presentation of the visual item by the flat panel display and the head mounted display in a coordinated and uncluttered manner. In one example embodiment, a token disposed proximate the flat panel display is detected by the depth camera and applied to define whether the ultrasonic sensor applies sensed gestures to the flat panel display visual image or the three dimensional image of the head mounted display. Based upon the selected primary display, an uncluttered visual presentation is coordinated across both displays with a visible surface determination for the view area by sorting the upright extents of the visual item's presentation at both displays in visibility order.

The present invention provides a number of important technical advantages. One example of an important technical advantage is that a graphical user interface clutter management supports automatic and dynamic switching between a set of positions sensors in a specific order to seamlessly manipulate objects otherwise constricted in a flat panel display environments. A relationship is determined of one or more augmented reality three dimensional objects to the visible portions of one or more other three dimensional objects with a visible-surface determination that associates augmented reality portions of an object with flat panel display portions of the object that are visible to an end user. Visible surfaces for the augmented reality and flat panel display views are allocated to define new objects, such as surface coloring, within projections of desired subset of existing objects, such as CAD design presented as an augmented reality item. For example, a shoe created as a CAD object is a deformed geometric object that can be approximated inside a rectangle. Visible surfaces of the shoe are separately defined as a geometric object and translated to present flat panel display surface views.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Visual space management across information handling system flat panel and augmented reality visual presentations automatically reduces visual clutter and assigns gesture inputs. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
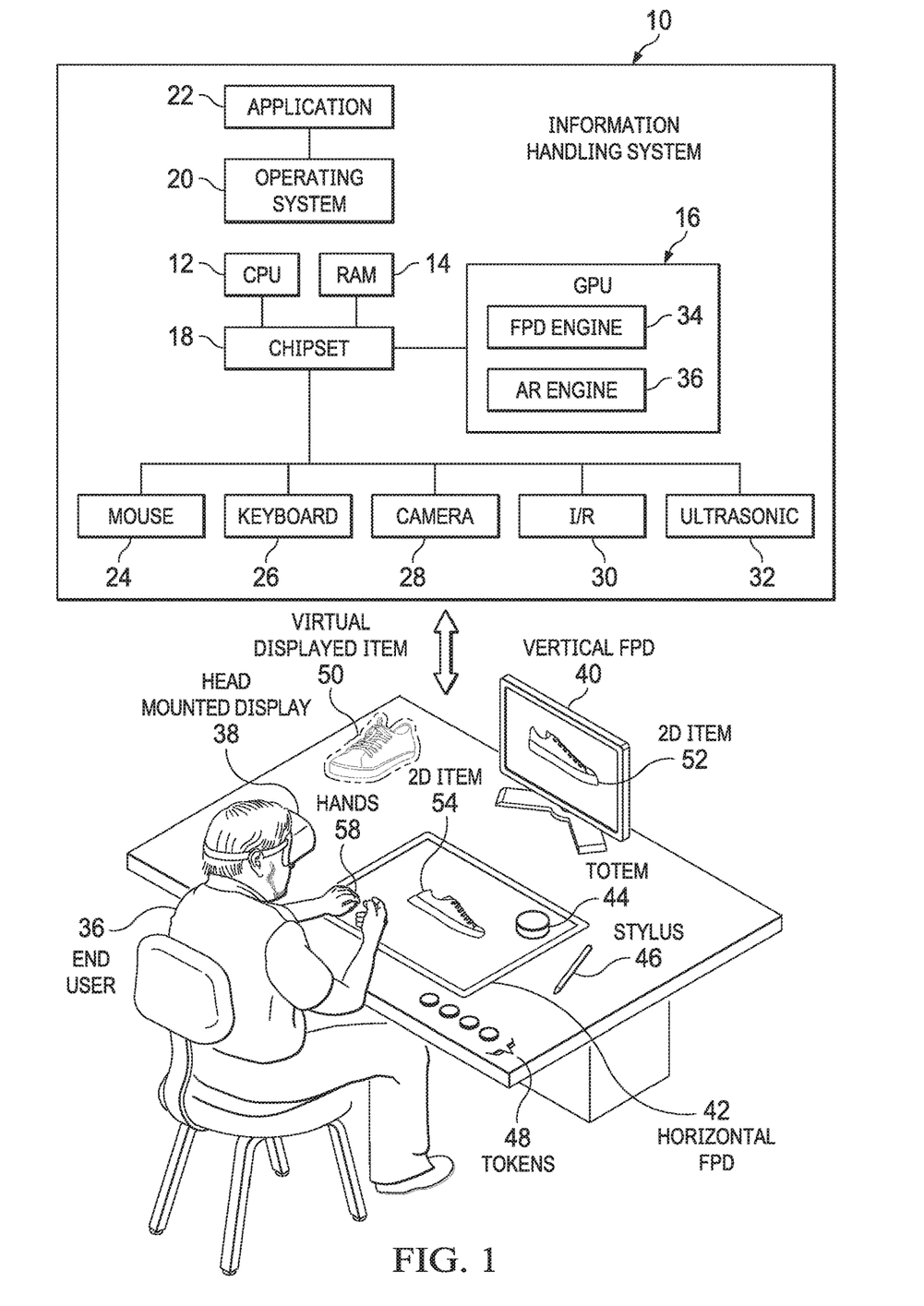
FIG. 1 depicts a block diagram of an information handling system having coordinated presentation of overlapping visual images.

Referring now to FIG. 1, a block diagram depicts an information handling system 10 having coordinated presentation of overlapping visual images 50 and 54. In the example embodiment, information handling system 10 processes information with a central processing unit (CPU) 12 that executes instructions stored in random access memory (RAM) 14. The information includes visual information that is communicated to one or more graphics processing units (GPUs) 16, such as for additional processing into pixel values that define visual images at a display. A chipset 18 manages physical interactions between CPU 12 and input/output (I/O) devices that an end user interacts with. In the example embodiment, an operating system 20 executes on CPU 12 to support execution of applications 22, such as computer assisted design (CAD) applications. An end user inputs information to the application through a variety of I/O devices, such as mouse 24, keyboard 26, camera 28 that captures gestures and physical devices, an infrared (I/R) sensor 30 that provides depth sensing for camera 28, and an ultrasonic sensor 32 that uses Doppler effects to detect end user gestures and other objects proximate to information handling system 10.

In the example embodiment, GPU 16 includes a flat panel display engine 34 and an augmented reality engine 36 that define pixel values for presentation of visual images at a head mounted display 38 and a flat panel displays 40 and 42. In alternative embodiments, separate GPUs may be used or visual information for presentation at head mounted display 38 may be communicated in an alternative format and processed into pixel values locally at head mounted display 38. In the example, a vertical flat panel display 40 presents visual images in a vertical configuration and a horizontal flat panel display 42 presents visual images in a horizontal configuration. Horizontal flat panel display 42 includes a touchscreen that detects end user touches to provide a works surface that an end user 56 interacts with using a variety of tools. In the example embodiment, a totem 44 translates touches made by an end user into inputs at horizontal flat panel display 42, such as by rotations or lateral movements of totem 44. A stylus 46 acts as a pen or brush that end user 56 uses to write or draw on horizontal flat panel display 42. Tokens 48 include identifiable features that have variable meanings based upon the context discerned by information handling system 10, such as with a defined shape captured by camera 28 or touches on horizontal flat panel display 42.

In the example embodiment, end user 56 has initiated a CAD application to perform design work on a shoe presented as a two dimensional visual image item 52 on flat panel displays 40 and 42, and as a three dimensional visual image item 50 presented through head mounted display 38. Head mounted display 38, for example, includes a projector that projects virtual item 50 in front of the eyes of end user 56 so that virtual item 50 appears as a three dimensional item at a location distal end user 56. For instance, end user 56 grasps virtual item 50 with hands 58 to manipulate virtual item 50, such as by rotating virtual item 50 to change its orientation. The position of hands 58 is tracked with sensors, such as camera 28 acting as a depth camera with infrared sensor 30 illumination or ultrasonic sensor 32. End user 56 may also interact with virtual item 50 using tools, such as stylus 46 to draw design lines or change surfaces colors. Simultaneous to interacting with virtual item 50, end user 56 may interact with two dimension visual items 52 and/or 54, such as with touches detected by sensors 28, 30 and 32, or with other I/O devices, such as mouse 24, keyboard 26 or touches at touchscreen flat panel display 42.

Mapping items presented on a flat panel display as two or three dimensional objects and also presented as a three dimensional virtual object by a head mounted display offers a full augmented reality view that enhances design work. For example, an end user can view and manipulate a virtual item presented through a head mounted display while also viewing other design information through the head mounted display that is presented on the flat panel display. Further, the end user can interact with either or both of the flat panel display or three dimensional virtual item to try various design iterations. For instance, with the example embodiment that presents a shoe as flat panel display items 52 and 54, and presents the shoe as three dimensional virtual item 50, item 50 is approximated inside a rectangle at a location relative to end user 56 defined by head mounted display 38. In various embodiments, head mounted display 38 may define the location as fixed relative to horizontal flat panel display 42, such as by relying on a visual reference of an integrated camera and accelerations sensed by integrated accelerometers, or may define the location as fixed relative to the head mounted display so that virtual item 50 remains in the same relative location based upon the end user's viewing area. In any case, determining the relationship of virtual item 50 and flat panel display items 52 and 54 presents a challenge that, if not properly addressed, results in clutter from overlapping visual images. Further, end user gestures as inputs should be directed to an intended view of the item, which can be unclear from the perspective of information handling system 10 when multiple views are active.

In the example embodiment, information handling system 10 uses sensors 28, 30 and 32 to detect items proximate horizontal flat panel display 42, including tokens 48, stylus 46 and totem 44. GPU 16 generates visual images with flat panel display engine 34 and augmented reality engine 36 to define a primary display based upon physical objects sensed by sensors 28, 30 and 32. For example, a square token 48 placed on horizontal flat panel display 42 indicates that three dimensional virtual item 50 presented by head mounted display 38 is the primary display towards which end user gestures are directed. In one embodiment, token 48 is moved to an icon presented by horizontal flat panel display 42 that defines the active display so that an end user can touch the icon to select the active display when token 48 is not readily accessible. In one example embodiment, selection of an active display by a token 48 also assigns sensors to support specific activities relative to the active display. For instance, placement of a square token 48 on horizontal flat panel display 42 assigns a depth camera, defined by camera 28 and infrared sensor 30, to detect large bodies in the desktop area while ultrasonic sensor 32 is assigned to detect fine motor activity applied to virtual item 50, such as finger gestures that rotate virtual item 50. Defining gesture inputs as directed toward a presented visual item allows the end user to perform inputs to the visual item that application 22 processes. For example, with the square token present and detected by the depth camera, end user gestures at virtual item 50 with stylus 46 may change the outer surface coloring of the depicted shoe. Application 22 then adapts the design so that the selected color is presented at flat panel display visual images 52 and 54.

Once the gesture environment is defined, a visible surface determination for the view area is performed by sorting the upright extents of the visual items 50, 52 and 54 in visibility order. Sorting in visibility order prevents clutter within the work environment by preventing overlapping displayed images. As an example, an end user generates a design presented on flat panel displays 40 and 42 as a two dimensional image. The end user then places a token 48 on horizontal flat panel display 42 to assign gestures detected by ultrasonic sensor 32 to visual images presented by head mounted display 38. To initiate presentation of three dimensional item 50 by head mounted display 38, end user 56 grasps two dimensional image 54 with hands 58 and raises image 54 upwards to a location above horizontal flat panel display 42, with head mounted display 38 presenting the raised image as three dimensional item 50. As item 50 is raised, visual images at flat panel displays 40 and 42 are altered to avoid clutter where sorting of the visibility order from item 50 towards flat panel displays 40 and 42 removes presentation of items 52 and 54 that overlap in the view of item 50. In one example embodiment, upon lifting of item 54 to present item 50, item 54 is removed from presentation at horizontal flat panel display 42. Once end user 56 is presented with an uncluttered view of item 50, end user 56 may manipulate the presentation of item 50, such as by changing the surface coloring as described above. For instance, end user 56 places a round token 48 on horizontal flat panel display 42 to enable color manipulation. Once the end user has completed work with item 50, removal of tokens 48 remove the presentation of item 50 and reassign ultrasonic sensor 32 to flat panel display presentations. In one alternative embodiment, end user 56 completes work with item 50 by gesturing item 50 back into horizontal flat panel display 42, such as by pushing item 50 into the position of item 54.

Figure 2:
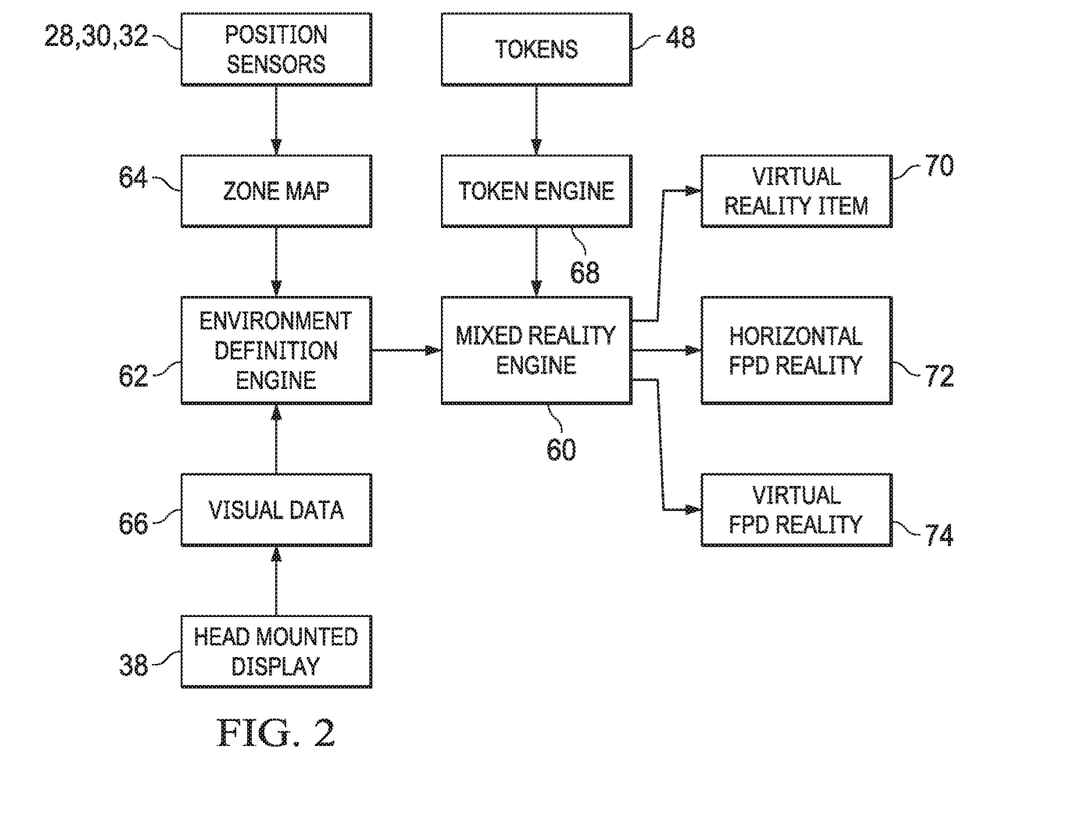
FIG. 2 depicts a block diagram of a system for visible space management across information handling system and augmented reality display presentations.

Referring now to FIG. 2, a block diagram depicts a system for visible space management across information handling system and augmented reality display presentations. A mixed reality engine 60 applies sensed conditions at the information handling system to define whether to present visual information as a virtual reality item 70, such as with a head mounted display, a horizontal flat panel display item 72, such as with a horizontal flat panel display, or a vertical flat panel display item 74, such as with a vertical flat panel display. Mixed reality engine is, for example, software or firmware code stored in non-transitory memory of the information handling system that executes on one or more processing components. For instance, mixed reality engine 60 includes embedded code stored in flash memory of a graphics processor and an application programming interface included in an operating system that coordinate presentation of visual information based upon sensed conditions. Mixed reality engine 60 determines which display presentation to prioritize based upon an analysis of tokens 48 determined by a token engine 68. For example, token engine 68 stores an assignment of token shapes to display presentation and manipulation functionalities. When a visual camera or depth camera detects a token of a defined shape, token engine 68 communicates the assigned functionality to mixed reality engine 60, which alters the presentation of visual items accordingly.

Mixed reality engine 60 manages gesture inputs at the presented visual images based upon detected tokens and inputs detected by position sensors 28, 30 and 32. In the example embodiment, an environment definition engine 62 provides sensed inputs to mixed reality engine 60 to manage gestures. Position sensors 28, 30 and 32 report detected physical items, such as tokens, and detected motions, such as gestures, to a zone map 64 that environment definition engine 62 relates to visual images presented by mixed reality engine 60. Similarly, environment definition engine 62 receives visual cues from head mounted display 38, such as visual data collected by an integrated camera. Environment definition engine 62 is, for example, embedded code stored in flash memory of an embedded controller or digital signal processor (DSP) that applies sensed gestures to a graphics controller for rapid display response.

Figure 3:
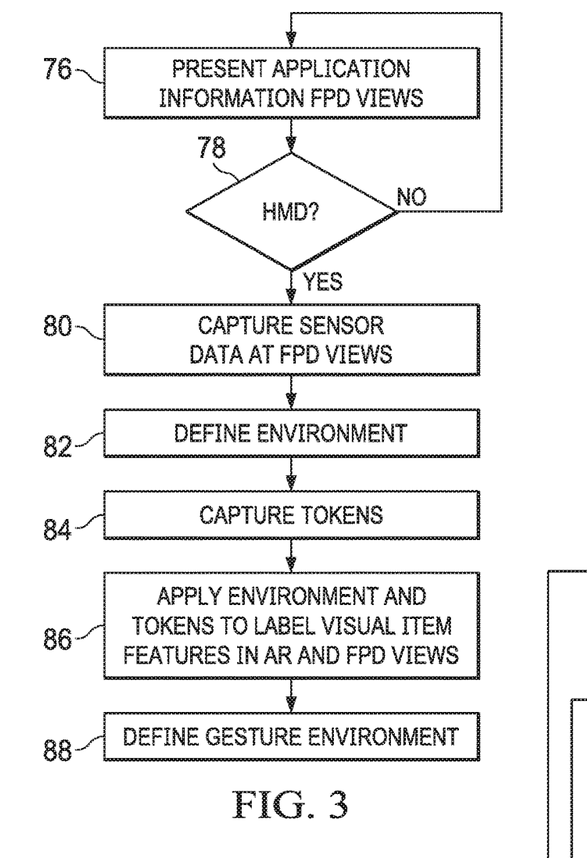
FIG. 3 depicts a flow diagram of a process for managing clutter in an augmented reality view that includes a share flat panel display view.

Referring now to FIG. 3, a flow diagram depicts a process for managing clutter in an augmented reality view that includes a shared flat panel display view. The process starts at step 76 with presentation of application visual information with one or more flat panel display views. At step 78, a determination is made of whether a head mounted display is activated and, if not, the process returns to step 76. If a head mounted display is active, the process continues to step 80 to capture sensor data at the flat panel display views. At step 82, the sensor data is applied to define the environment at the flat panel displays, such as the visual images presented and objects sensed in the proximity of the flat panel displays. At step 84, tokens disposed in the environment are captured, such as with a depth camera. At step 86, the detected environment conditions and tokens are applied to label visual item features in the augmented reality and flat panel display views. For example, a visible surface determination is performed for the end user view by sorting the upright extents of the visual item in visibility order so that clutter related to overlapping images is avoided. At step 88, the gesture environment is defined based upon the presented visual images and detected tokens. For example, a depth camera monitors the environment for large movements and shapes, and an ultrasonic sensor detects gestures as associated with a visual item indicated as active by detected tokens.

Figure 4:
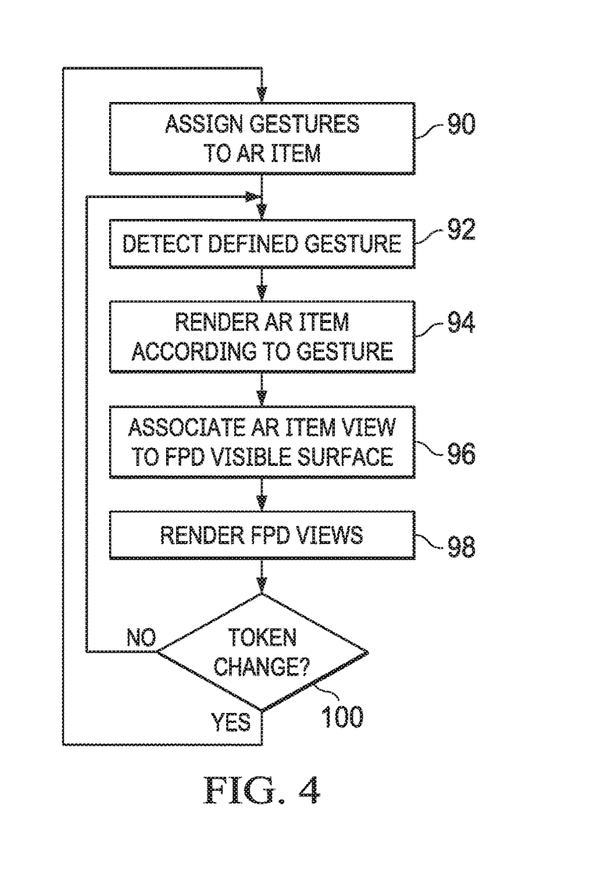
FIG. 4 depicts a flow diagram of a process for managing gestures in a mixed reality view that includes a flat panel display view.

Referring now to FIG. 4, a flow diagram depicts a process for managing gestures in a mixed reality view that includes a flat panel display view. The process starts at step 90 by assigning gestures to an augmented reality item, such as a three dimensional visual image presented by a head mounted display. At step 92, a gesture is detected by a sensor, such as an ultrasonic sensor, that falls within defined gestures applicable to the augmented reality visual item. At step 94, the augmented reality item is rendered according the to the gesture, such as by rotating the visual item presented by a head mounted display in a direction indicated by an end user finger. At step 96, the newly rendered view of the augmented reality item is associated with a flat panel display visible surface view. For example, the object orientation information from the augmented reality view is passed to the graphics processor that generates the flat panel display view so that a visible surface in two dimensions for the orientation is determined. At step 98, the flat panel display view at the selected orientation is rendered. At step 100, a determination is made of whether tokens associated with the environment have changed, such as by a scan of the depth camera. If the tokens have not changed, the process returns to step 92. If the tokens have changed, the process returns to step 90 to re-assign gestures to the augmented reality items.

Figure 5:
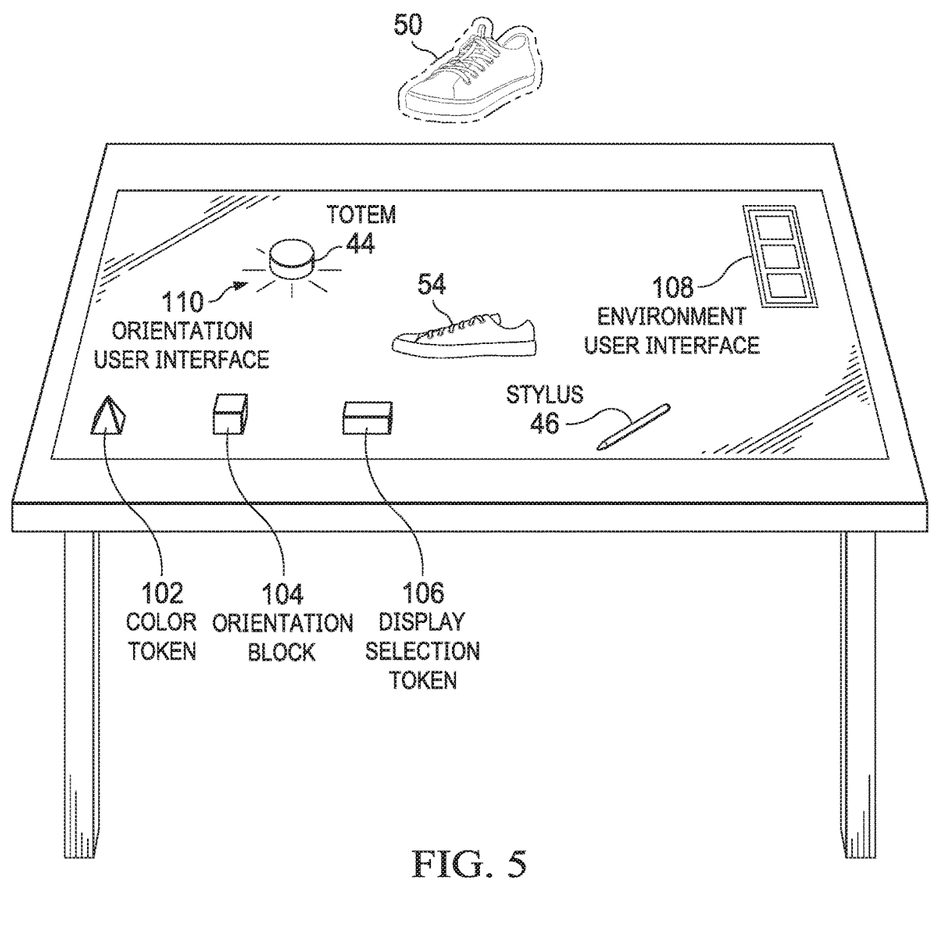
FIG. 5 depicts a mixed reality view having space management of clutter performed with tokens.
Figure 6A:
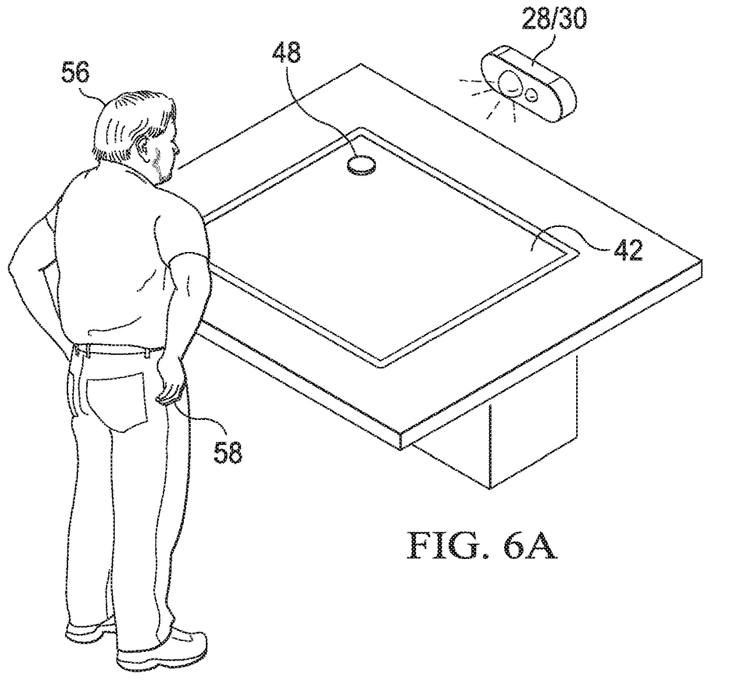
FIGS. 6A-6D, generally referred to as FIG. 6, depict a mixed reality view that presents physical items scaled to virtual content that an end user manipulates with gestures to move positions and change orientation.
Figure 6B:
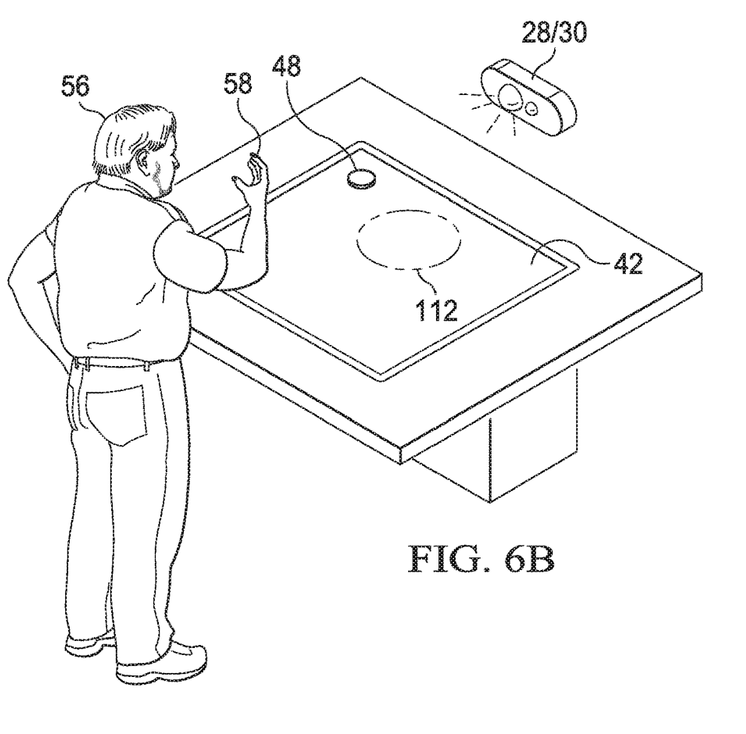
Figure 6C:
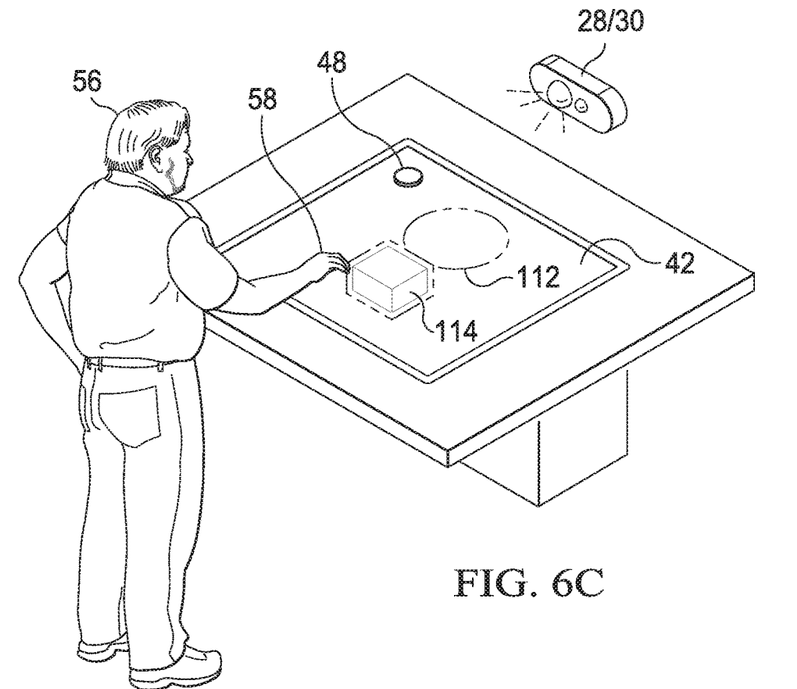
Figure 6D:
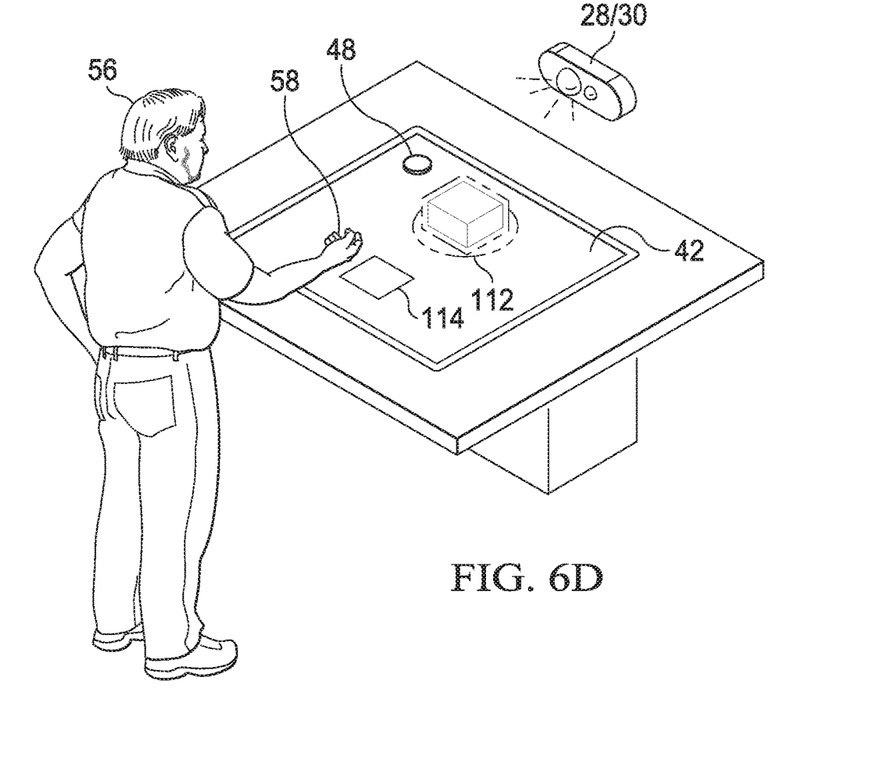

Referring now to FIG. 5, a mixed reality view is depicted having space management of clutter performed with tokens. Specific hardware provisioning to dynamically switch between a set of sensors in a defined order seamlessly manipulates objects constricted by two dimensional environments. A key in the form of a geometric feature, such as the shape of a token, mapped to sensors for supporting gesture inputs enables uncluttered three dimensional interactions. In the example embodiment, a color token 102 has a triangular shape that, when detected on horizontal flat panel display 42, indicates gestures at three dimensional visual item 50 should adjust the color of the surface. An orientation block token 104 has a square shape that, when detected on horizontal flat panel display 42, indicates that gestures are intended for three dimensional visual item 50. In one example embodiment, placing token 104 on flat panel display 42 commands item 54 to remove and transitions item 54 to present as item 50. In an alternative embodiment, a display selection token 106 has a rectangular shape that an end user can rotate to change between primary or active display presentations. For instance, rotating token 106 causes virtual display item 50 to appear and disappear with item 54 becoming the focus of gestures when item 50 is not active. In alternative embodiments, an end user may provide other inputs to indicate an active view and gesture focus. For example, an environment user interface 108 may provide a list of options that lets the user select three dimensional presentation of item 50 and assign specific gestures to item 50. As another alternative, totem 44 may include an orientation user interface that defines an active view and gesture focus. Other embodiments may use gestures to vary views and gesture focus, voice control or sound control, such as clapping of hands together.

Referring now to FIG. 6, a mixed reality view presents physical items scaled to virtual content that an end user 56 manipulates with gestures to move positions and change orientation. In the example embodiment, end user 56 gazes at horizontal flat panel display 42 with hands 58 in an idle location at her hips. A token 48 rests on flat panel display 42 to indicate activation of three dimensional viewing by a head mounted display (not shown). For example, gaze information is captured by the head mounted display. A depth camera 28 with infrared sensor 30 captures an image of objects placed on flat panel display 42. End user 56 then raises a hand 58 to indicate activation of three dimensional viewing. Based upon the gaze and hand position of end user 56, a free space zone 112 is defined at which three dimensional images will be located when selected by end user 56. In the example embodiment, end user 56 next places an object 114 on horizontal flat panel display 42 with a gesture to indicate a request for a three dimensional representation of the object by the head mounted display. Based upon dimensions captured by depth camera 28, the head mounted display generates a three dimensional image of object 114 within space 112.

The example embodiment illustrates extraction of a two dimensional approximation of objects within the environment of flat panel display 42. An end user captures a physical object in a real world scene and presents the object as a three dimensional image that the end user positions, rotates and scales in dimension. End user inputs through gestures automatically align objects with a constraint whenever the user moves the object near to that constraint, such as sitting or standing. Once an object is presented as a three dimensional item, token selection provides an end user with an interactive basis for changing the items outer surface appearance in color, hue, gamma and other geometric and appearance aspects. In one example embodiment, information handling systems tier external objects to local public and private policy related to capture and presentation of objects. For instance, data is tiered and provisioned to a user interface of a tablet or flat panel display device or user interface movement based input. In another example, priority set rules may be applied that void gestures or swipes if information associated with the gesture or swipe is deemed private, such as bank or personal information.

Although the present invention has been described in detail, it should be understood that various changes, substitutions and alterations can be made hereto without departing from the spirit and scope of the invention as defined by the appended claims.

What is claimed is:

1. An information handling system comprising:
a processor operable to execute instructions that process information;
a memory interfaced with the processor and operable to store the instructions and information;
a flat panel display operable to present visual information as visual images;
a head mounted display operable to present visual information as three dimensional visual images focused at a location in front of the head mounted display;
one or more graphics processors interfaced with one or more of the flat panel display and head mounted display and operable to communicate the visual information to the flat panel display and head mounted display formatted for presentation as visual images;
a plurality of sensors disposed proximate the flat panel display and operable to sense end user hand gestures;
a token having one or more features identifiable by one or more of the plural sensors; and
an environment definition engine interfaced with the plural sensors and the one or more graphics processors, the environment definition engine applying gestures detected by the plural sensors to visual images of the flat panel display absent the token identification of the token by the one or more of the plural sensors and applying gestures detected by the plural sensors to the visual images of the head mounted display in the event of identification of the token.

2. The information handling system of claim 1 wherein:
the plural sensors comprise at least a depth camera and an ultrasonic sensor;
the environment definition engine applies the ultrasonic sensor to manipulate the head mounted display visual images if the depth camera detects the token.

3. The information handling system of claim 2 wherein the token features include a predetermined geometric shape.

4. The information handling system of claim 2 wherein the token features include a predetermined placement on the flat panel display.

5. The information handling system of claim 1 further comprising a mixed reality engine interfaced with the environment definition engine, the mixed reality engine coordinating presentation of flat panel display and head mounted display visual images by sorting upright extents of the visual images in visibility order.

6. The information handling system of claim 5 wherein the token is associated with color selection and the gestures include at least a hand movement associate with color selection.

7. The information handling system of claim 6 wherein the mixed reality engine applies colors selected for presentation at the head mounted display visual image to the flat panel display visual image.

8. The information handling system of claim 7 wherein the token comprises a stylus.

9. A method for presenting visual information at an information handling system, the method comprising:
executing an application on the information handling system to generate the visual information;
presenting the visual information as a visual image at a flat panel display interfaced with the information handling system;
detecting a predetermined object proximate the flat panel display with at least one of plural sensors;
in response to the detecting, presenting a three dimensional visual image of the image at the flat panel display with a head mounted display interfaced with the information handling system, the three dimensional image presented at a location proximate the visual image presented at the flat panel display;
in response to the detecting, associating one or more of the plural sensors to interact with the location of the three dimensional visual image; and
altering the three dimensional visual image in response to hand movements detected at the location by the one or more of the plural sensors.

10. The method of claim 9 further comprising:
initiating the location at the visual image presented on the flat panel display;
detecting a gesture from the location upwards; and
generating the three dimensional visual image at the location and moving the three dimensional visual image upward with the gesture to have a location raised above the flat panel display.

11. The method of claim 10 further comprising:
detecting overlap of the three dimensional visual image and the flat panel display visual image; and
in response to the detecting, altering the visual image at the flat panel display to remove the overlap.

12. The method of claim 9 wherein:
the plural sensors comprise at least a depth camera and an ultrasonic sensor;
detecting a predetermined object comprises detecting a token on the flat panel display with the depth camera; and
associating one or more of the plural sensors to interact with a location of a three dimensional visual image further comprises associating the ultrasonic sensor to detect gestures as inputs at the three dimensional visual image location.

13. The method of claim 9 further comprising:
    detecting a second predetermined object associated with color of the three dimensional visual image;
    altering the color at the three dimensional visual image in response to the detecting; and
    altering the flat panel display visual image to have the color in response to the detecting.

14. The method of claim 13 wherein the second predetermined object comprises a stylus.

15. The method of claim 9 further comprising:
    detecting manipulation of the predetermined object; and
    in response to the detecting manipulation, associating the one or more of the plural sensors with inputs to the flat panel display visual image.

16. The method of claim 15 further comprising:
    detecting overlap of the three dimensional visual image and the flat panel display visual image; and
    in response to the detecting, altering the three dimensional visual image to remove the overlap.

17. A method for presenting visual information at an information handling system, the method comprising:
    interfacing a flat panel display and a head mounted display with an information handling system;
    monitoring an area proximate the flat panel display with plural sensors;
    detecting a first predetermined condition with the plural sensors;
    in response to the first predetermined condition, rendering an item as a visual image at only the flat panel display;
    detecting a second predetermined condition with the plural sensors;
    in response to detecting the second predetermined condition, rendering the item as a visual image at both the flat panel display and the head mounted display; and
    in response to detecting the second predetermined condition, assigning gestures detected by one of the plural sensors to manipulation of the visual image presented by the head mounted display.

18. The method of claim 17 wherein the plural sensors comprise a depth camera and an ultrasonic sensor, the one of the plural sensors being the ultrasonic sensor, the ultrasonic sensor detecting gestures at a location of the head mounted display presentation of the visual image as a three dimensional visual image.

19. The method of claim 18 comprising:
    comparing the relative view of the three dimensional visual image and the flat panel display visual image; and
    sorting the upright extents of the three dimensional visual image and the flat panel display visual image to present the three dimensional visual image without overlap of the flat panel display visual image.

20. The method of claim 18 wherein the gesture comprises altering the three dimensional visual image surface color, the method further comprising rendering the flat panel display visual image to have the surface color selected by the gesture.

* * * * *